United States Patent
Yanagibayashi et al.

(10) Patent No.: US 11,307,179 B2
(45) Date of Patent: Apr. 19, 2022

(54) LIQUID FEEDING DEVICE AND FLUID CHROMATOGRAPH

(71) Applicant: SHIMADZU CORPORATION, Kyoto (JP)

(72) Inventors: Jun Yanagibayashi, Kyoto (JP); Shinya Imamura, Kyoto (JP); Keisuke Ogawa, Kyoto (JP); Masataka Nikko, Kyoto (JP); Shinichi Fujisaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 287 days.

(21) Appl. No.: 16/648,077

(22) PCT Filed: Oct. 23, 2017

(86) PCT No.: PCT/JP2017/038208
§ 371 (c)(1),
(2) Date: Mar. 17, 2020

(87) PCT Pub. No.: WO2019/082243
PCT Pub. Date: May 2, 2019

(65) Prior Publication Data
US 2020/0278329 A1 Sep. 3, 2020

(51) Int. Cl.
*G01N 30/32* (2006.01)
*F04B 49/20* (2006.01)
(Continued)

(52) U.S. Cl.
CPC ........... *G01N 30/32* (2013.01); *B01D 15/163* (2013.01); *F04B 11/0058* (2013.01);
(Continued)

(58) Field of Classification Search
CPC .. G01N 30/32; G01N 30/34; G01N 2030/027; G01N 2030/324;
(Continued)

(56) References Cited

U.S. PATENT DOCUMENTS 4,808,077 A * 2/1989 Kan .................... F04B 11/0058
417/18
5,637,208 A * 6/1997 Dourdeville ............ F04B 49/22
210/90

(Continued)

OTHER PUBLICATIONS

International Search Report for corresponding Application No. PCT/JP2017/038208, dated Jan. 9, 2018.
(Continued)

*Primary Examiner* — Justin N Olamit
(74) *Attorney, Agent, or Firm* — Renner, Otto, Boisselle & Sklar, LLP (57) ABSTRACT

The liquid feeding device includes a discharge speed calculation part configured to calculate a discharge speed v of the plunger pump so that a converted value $L_{ATM}$ under an atmospheric pressure of a flow rate $L_{PRE}$ of the mobile phase discharged to the discharge channel from the pump part becomes a set flow rate $L_{SET}$ using a volume V of the mobile phase in the pump chamber of the closing pump immediately before the precompression process is started, a volume ΔV reduced due to the precompression process of the mobile phase in the pump chamber of the closing pump, and a feeding pressure P; and a discharge operation controller configured to control a discharge speed of the plunger pump to a discharge speed v calculated by the discharge speed calculation part.

6 Claims, 5 Drawing Sheets

(51) Int. Cl.
  *G01N 30/34* (2006.01)
  *F04B 23/06* (2006.01)
  *F04B 49/06* (2006.01)
  *B01D 15/16* (2006.01)
  *F04B 11/00* (2006.01)
  *G01N 30/02* (2006.01)

(52) U.S. Cl.
  CPC ............ *F04B 23/06* (2013.01); *F04B 49/065* (2013.01); *F04B 49/20* (2013.01); *G01N 30/34* (2013.01); *F04B 2201/0202* (2013.01); *G01N 2030/027* (2013.01); *G01N 2030/326* (2013.01)

(58) Field of Classification Search
  CPC ........... G01N 2030/326; F04B 11/0058; F04B 23/06; F04B 49/065; F04B 49/20; F04B 2201/0202; B01D 15/163
  See application file for complete search history.

(56) References Cited

U.S. PATENT DOCUMENTS

| | | | |
|---|---|---|---|
| 8,123,496 | B2* | 2/2012 | Ishii ...................... G01N 30/32 417/20 |
| 9,360,006 | B2 | 6/2016 | Herzog |
| 9,410,543 | B2* | 8/2016 | Tokuo ..................... F04B 13/00 |
| 10,514,028 | B2* | 12/2019 | Imamura ............... F04B 49/065 |
| 2020/0182235 | A1* | 6/2020 | Yanagibayashi .... F04B 11/0058 |

OTHER PUBLICATIONS

Written Opinion for corresponding Application No. PCT/JP2017/038208, dated Jan. 9, 2018.

* cited by examiner

LIQUID FEEDING DEVICE AND FLUID CHROMATOGRAPH

TECHNICAL FIELD

The present invention relates to a liquid feeding device that stably feeds a mobile phase by operating a plurality of plunger pumps in a complementary manner, and to a fluid chromatograph such as a high performance liquid chromatograph (HPLC) or a supercritical fluid chromatograph (SFC) using the liquid feeding device.

BACKGROUND ART

The liquid feeding device used in an HPLC system is required to have a capability of stably feeding the mobile phase at a high pressure. Therefore, a double plunger type liquid feeding device in which two plunger pumps are connected in series or in parallel is generally used.

As an example, in a liquid feeding device in which two plunger pumps are connected in series, a primary-side plunger pump on an upstream side and a secondary-side plunger pump on a downstream side operate in a complementary manner, and its discharge process includes a liquid feeding process by the primary-side plunger pump and a liquid feeding process by the secondary-side plunger pump.

In the discharge process by the primary-side plunger pump, the secondary-side plunger pump performs a suction operation while the primary-side plunger pump discharges the liquid, and a part of the liquid discharged by the primary-side plunger pump is sucked by the secondary-side plunger pump. In the discharge process by the secondary-side plunger pump, the secondary-side plunger pump performs the discharge operation, and the primary-side plunger pump performs the suction operation during that time.

In the discharge process by the primary-side plunger pump, a flow rate obtained by subtracting a suction flow rate of the secondary-side plunger pump from the discharge flow rate of the primary-side plunger pump becomes a liquid feed flow rate of the liquid feeding device, and in the discharge process by the secondary-side plunger pump, the discharge flow rate of the secondary-side plunger pump is a liquid feed flow rate of the liquid feeding device.

Such a liquid feeding device of a series-type double plunger system is provided with valves for preventing backflow on the inlet side and the outlet side of the primary-side plunger pump. When the primary-side plunger pump performs the discharge operation, the inlet-side valve is closed, and the outlet-side valve is opened. When the primary-side plunger pump performs the suction operation, the inlet-side valve is opened, and the outlet-side valve is closed.

Since the suction operation of the primary-side plunger pump is performed with the outlet-side valve closed, the pressure in the pump chamber of the primary-side plunger pump after the suction operation of the primary-side plunger pump is completed is lower than the system pressure (the pressure in the analysis channel of HPLC or SFC). When the pump that performs the discharge operation in this state is switched from the secondary-side plunger pump to the primary-side plunger pump, liquid is not discharged from the primary-side plunger pump until the pressure in the pump chamber of the primary-side plunger pump rises to the same pressure as the system pressure. As a result, a liquid feed flow rate temporarily decreases, and the stability of the liquid feed flow rate decreases.

Due to such problems, it is proposed and also implemented that during the discharge process of the secondary-side plunger pump, the primary-side plunger pump performs, in addition to the liquid suction operation, a precompression operation of driving the plunger in the discharge direction so that the pressure in the pump chamber is raised to a pressure close to the system pressure (see Patent Documents 1 and 2).

The same applies to a liquid feeding device of a parallel-type double plunger system in which two plunger pumps are connected in parallel. While one plunger pump is performing the discharge operation, the other plunger pump performs the suction operation and the precompression operation.

PRIOR ART DOCUMENTS

Patent Documents

Patent Document 1: U.S. Pat. No. 5,637,208
Patent Document 2: U.S. Pat. No. 9,360,006

SUMMARY OF THE INVENTION

Problems to be Solved by the Invention

As a problem with the liquid feeding device used in HPLC, there is a problem of deviation in flow rate accuracy mainly due to the compressibility of the mobile phase. Since the analysis channel upstream of the HPLC analytical column is in a high pressure state, a compressed mobile phase is fed from the liquid feeding pump. On the other hand, since the pressure inside of the analysis channel lowers to atmospheric pressure on the outlet side of the analytical column, the volume flow rate of the mobile phase is different between the inlet side and the outlet side of the analytical column. For this reason, even if the drive speed of the plunger is controlled so that the flow rate of the mobile phase discharged from the plunger pump becomes a set flow rate, the volume flow rate of the mobile phase flowing through the outlet side of the analytical column is larger than the set flow rate.

Therefore, in order to accurately control the volume flow rate of the mobile phase on the outlet side of the analytical column to the set flow rate, it is necessary to determine the drive speed of the plunger of the liquid feeding device in consideration of the compressibility of the mobile phase. In order to determine the drive speed of the plunger in consideration of the compressibility of the mobile phase, it is conceivable to calculate the drive speed of the plunger by using a compressibility input by the user or a compressibility selected on the device side based on the type of mobile phase input by the user.

However, it is complicated to ask the user to input information on the type of mobile phase, which may cause an input error. Moreover, it is unrealistic to prepare an accurate value of compressibility in advance for a wide variety of mobile phase types and compositions. Furthermore, when the mobile phase is adiabatically compressed in a short time, the mobile phase expands by heat, and the effective compressibility decreases. This is known as the relationship of adiabatic compressibility<isothermal compressibility. That is, the compressibility has a dependency on the time required for the precompression process. This is also an obstacle to preparing an accurate compressibility in advance.

Therefore, the present invention has been made in view of the above problems and has an object to improve a deviation in the liquid feed flow rate due to the compressibility of the mobile phase by more accurately controlling the drive speed of the plunger so that the volume flow rate of the mobile phase becomes a predetermined flow rate under atmospheric pressure without any prior information on the type and compressibility of the mobile phase.

Solutions to the Problems

A liquid feeding device according to the present invention includes a discharge channel, a pump part, a feeding pressure sensor, a precompression process execution part, a discharge speed calculation part, and a discharge operation controller.

The pump part has a plurality of plunger pumps connected in series or in parallel to each other, and discharges the mobile phase to the discharge channel. At least one of the plurality of plunger pumps of the pump part is a closing pump in which communication with the discharge channel is shut off during a non-discharge time during which a discharge process for discharging the mobile phase to the discharge channel is not executed.

The feeding pressure sensor detects a feeding pressure which is a pressure in the discharge channel.

The precompression process execution part is configured to, based on at least an output of the feeding pressure sensor, execute a precompression process for causing the closing pump during the non-discharge time after completing a suction process for sucking a liquid into the pump chamber to perform a discharge operation so that the pressure in the pump chamber of the closing pump is substantially equal to the feeding pressure.

The discharge speed calculation part is configured to calculate a discharge speed v of the plunger pump so that a converted value $L_{ATM}$ under an atmospheric pressure of a flow rate $L_{PRE}$ of a mobile phase discharged to the discharge channel from the pump part becomes a set flow rate $L_{SET}$ using a volume V of the mobile phase in the pump chamber of the closing pump immediately before the precompression process is started, a volume ΔV, reduced due to the precompression process, of the mobile phase in the pump chamber of the closing pump, and the feeding pressure P.

The discharge operation controller is configured to control a discharge speed of the plunger pump during the discharge process to the discharge speed v calculated by the discharge speed calculation part.

It is preferable to further include a non-discharge time pressure sensor detecting a non-discharge time pressure which is a pressure in the pump chamber of the closing pump during the non-discharge time so that the precompression process is accurately executed. In this case, the precompression process execution part is configured to cause the closing pump to perform a discharge operation so that the non-discharge time pressure is substantially equal to the feeding pressure, based on the output of the feeding pressure sensor and the output of the non-discharge time pressure sensor in the precompression process.

However, the precompression process can be executed even if the non-discharge time pressure sensor is not provided. Patent Document 2 discloses a technique for accurately performing precompression by performing constant pressure feedback control based on a feeding pressure. In this technique, a precompression process is performed by causing the closing pump to perform a discharge operation by a predetermined amount, and immediately after that, a discharge process of the closing pump is performed. If the precompression at the closing pump is insufficient, a negative pulsation occurs during the discharge process of the closing pump, and therefore, in this case, a positive plunger displacement is applied to the closing pump. Conversely, if the precompression at the closing pump is excessive, a positive pulsation occurs, and therefore, in this case, a negative plunger displacement is applied to the closing pump. Then, such a plunger displacement pattern is stored and reflected in the precompression process at the next cycle. Thus, even if the non-discharge time pressure sensor is not provided, the precompression process can be performed so that the non-discharge time pressure becomes substantially the same as the feeding pressure while the cycle is repeated.

In a preferred embodiment of the liquid feeding device according to the present invention, the discharge speed calculation part is configured to calculate a compressibility β of the mobile phase by using a volume V (hereinafter referred to as "internal volume V before precompression") of the mobile phase in the pump chamber of the closing pump immediately before the precompression process is started, a volume ΔV (hereinafter referred to as "precompression volume ΔV"), reduced due to the precompression process, of the mobile phase in the pump chamber of the closing pump, and the feeding pressure P, and to calculate the discharge speed v of the plunger pump based on the compressibility β and the feeding pressure P.

In the above case, the discharge speed calculation part is preferably configured to read the feeding pressure P in a cycle shorter than a cycle in which the precompression process of the closing pump is executed, and each time, calculate the discharge speed v of the plunger pump using the latest feeding pressure P read and the latest compressibility β of the mobile phase. By doing so, an appropriate discharge speed of the plunger pump corresponding to the feeding pressure P can be obtained in real time even when the feeding pressure P changes over time during the cycle in which the precompression process is executed.

By the way, a value based on the mechanical design of the plunger pump can be used as the internal volume V before precompression. However, the actual internal volume V of the pump chamber may deviate from the design value due to a processing error of each component constituting the plunger pump or the like.

Therefore, a preferred embodiment of the liquid feeding device according to the present invention further includes: an internal volume calculation part configured to suck the mobile phase having a known compressibility into the pump chamber of the closing pump and then execute the precompression process, and to obtain information regarding an internal volume of the pump chamber using a discharge operation amount of the closing pump, the feeding pressure, and the known compressibility of the mobile phase in the precompression process; and an internal volume storage part storing information regarding the internal volume of the pump chamber obtained by the internal volume calculation part, in which the discharge speed calculation part is configured to use the information on the internal volume stored in the internal volume storage part as a volume V of the mobile phase in the pump chamber of the closing pump immediately before the precompression process is started to obtain the discharge speed v. Thereby, the actual internal volume of the pump chamber can be accurately grasped, and the discharge speed of the plunger pump during the discharge process can be accurately obtained by using it.

A fluid chromatograph according to the present invention includes: an analysis channel; a liquid feeding device of the present invention, feeding a mobile phase in the analysis channel; a sample injection part configured to inject a sample into the analysis channel; an analytical column provided downstream of the sample injection part on the analysis channel and separating the sample injected by the sample injection part into components; and a detector provided downstream of the analytical column on the analysis channel and detecting the components separated by the analytical column.

Effects of the Invention

The liquid feeding device according to the present invention includes: a discharge speed calculation part configured to calculate a discharge speed v of the plunger pump so that a converted value $L_{ATM}$ under an atmospheric pressure of a flow rate $L_{PRE}$ of the mobile phase discharged to the discharge channel from the pump part becomes a set flow rate $L_{SET}$ using a volume V of the mobile phase in the pump chamber of the closing pump immediately before the precompression process is started, a volume ΔV, reduced by the precompression process, of the mobile phase in the pump chamber of the closing pump, and the feeding pressure P; and a discharge operation controller configured to control a discharge speed of the plunger pump during the discharge process to the discharge speed v calculated by the discharge speed calculation part, and therefore, it is possible to accurately control the drive speed of the plunger so that the volume flow rate of the mobile phase under the atmospheric pressure becomes the set flow rate $L_{SET}$ without using information regarding the type and compressibility of the mobile phase. Thereby, the deviation of the liquid feed flow rate due to the compressibility of the mobile phase becomes smaller.

Since the fluid chromatograph according to the present invention includes the above-described liquid feeding device, the flow rate at the outlet side of the analytical column is controlled to the set flow rate, and the deviation of liquid feed flow rate due to the compressibility of the mobile phase becomes smaller.

EMBODIMENT OF THE INVENTION

Figure 5:
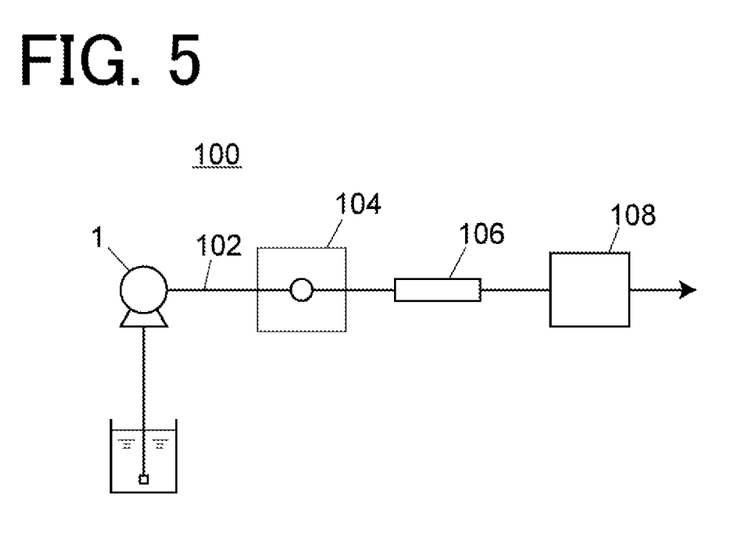
FIG. 5 is a schematic configuration diagram showing an example of a liquid chromatograph.

First, an embodiment of a liquid chromatograph, which is one of fluid chromatographs, will be described with reference to FIG. 5.

A liquid chromatograph 100 includes a liquid feeding device 1, an analysis channel 102, a sample injection part 104, an analytical column 106, and a detector 108. The liquid feeding device 1 is for feeding a mobile phase in the analysis channel 102. The sample injection part 104 injects a sample into the analysis channel 102, and is realized by, for example, an autosampler. The analytical column 106 is provided downstream of the sample injection part 104 on the analysis channel 102 and is for separating the sample injected into the analysis channel 102 by the sample injection part 104. The detector 108 is provided downstream of the analytical column 106 on the analysis channel 102 and is for detecting components separated by the analytical column 106.

The upstream portion of the analytical column 106 in the analysis channel 102 has a high pressure (pressure higher than an atmospheric pressure), while the downstream portion of the analytical column 106 has the atmospheric pressure. That is, a mobile phase fed by the liquid feeding device 1 flows in a compressed state in the upstream portion of the analytical column 106 in the analysis channel 102, while it flows in an uncompressed state in the downstream portion of the analytical column 106. Therefore, a volume flow rate of the mobile phase differs between the upstream side and the downstream side of the analytical column 106.

The liquid feeding device 1 operates in such a way that the volume flow rate of the mobile phase in the downstream portion of the analytical column 106 in the analysis channel 102, that is, the volume flow rate of the mobile phase under the atmospheric pressure becomes a preset flow rate.

Figure 1:
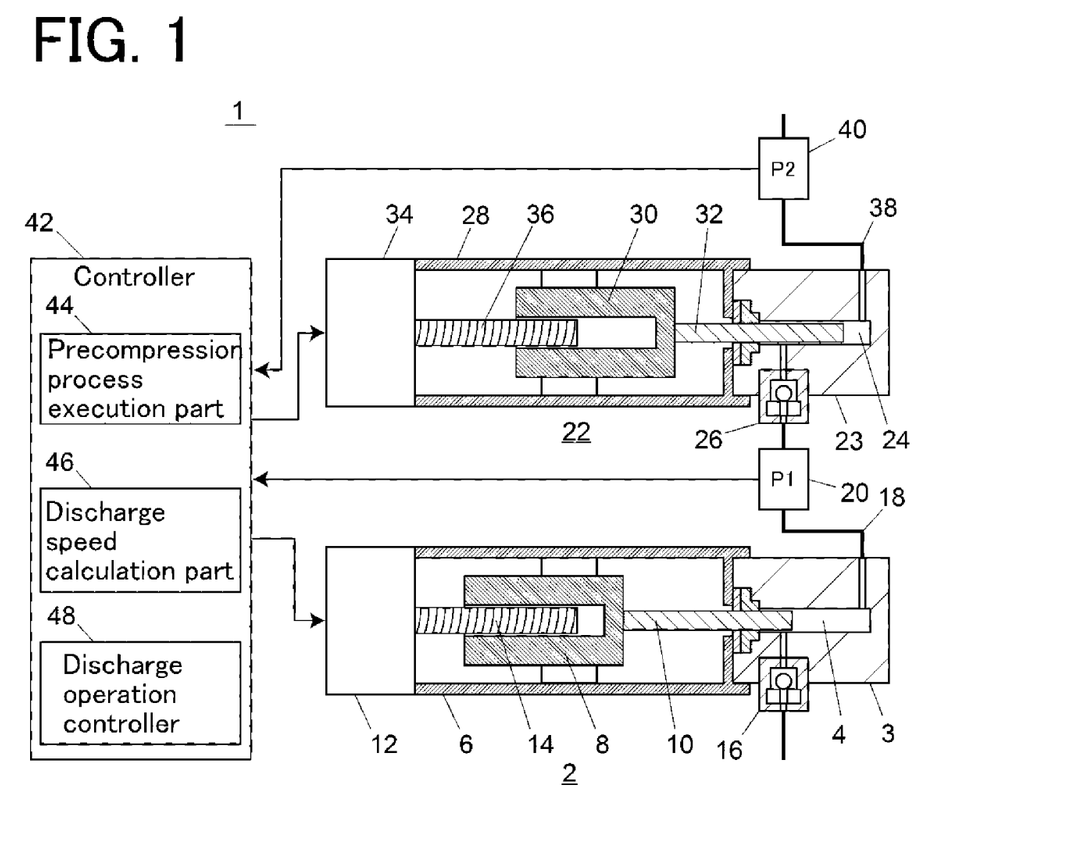
FIG. 1 is a schematic configuration diagram showing an embodiment of a liquid feeding device.

An embodiment of the liquid feeding device will be described with reference to FIG. 1.

The liquid feeding device 1 includes two plunger pumps, that is, a primary-side pump 2 and a secondary-side pump 22. The primary-side pump 2 and the secondary-side pump 22 are connected in series with each other. The primary-side pump 2 and the secondary-side pump 22 constitute a pump part that feeds a liquid through a discharge channel 38.

The primary-side pump 2 includes a pump head 3 having a pump chamber 4 therein and a pump body 6. The pump head 3 is provided at the tip of the pump body 6. The pump head 3 is provided with an inlet for allowing the liquid to flow into the pump chamber 4 and an outlet for allowing the liquid to flow out of the pump chamber 4. A check valve 16 is provided at the inlet of the pump head 3 to prevent back flow of liquid.

The tip of a plunger 10 is slidably inserted into the pump chamber 4. The proximal end of the plunger 10 is held by a crosshead 8 accommodated in the pump body 6. The crosshead 8 moves in one direction (left-right direction in the figure) in the pump body 6 by the rotation of a feed screw 14, and the plunger 10 moves in one direction accordingly. A primary-side pump drive motor 12 that rotates the feed screw 14 is provided at the proximal end portion of the pump body 6. The primary-side pump drive motor 12 is a stepping motor.

The secondary-side pump 22 includes a pump head 23 having a pump chamber 24 therein and a pump body 28. The pump head 23 is provided at the tip of the pump body 28. The pump head 23 is provided with an inlet for allowing a liquid to flow into the pump chamber 24 and an outlet for allowing the liquid to flow out of the pump chamber 24. A check valve 26 that prevents backflow of liquid is provided at the inlet of the pump head 23.

A distal end of a plunger 32 is slidably inserted into the pump chamber 24. The proximal end of the plunger 32 is held by a crosshead 30 accommodated in the pump body 28. The crosshead 30 moves in one direction (left-right direction in the figure) in the pump body 28 by the rotation of a feed screw 36, and the plunger 32 moves in one direction accordingly. A secondary-side pump drive motor 34 that rotates the feed screw 36 is provided at the proximal end portion of the pump body 28. The secondary-side pump drive motor 34 is a stepping motor.

The inlet of the pump head 3 is connected to a container (not shown) for storing a liquid to be fed via a channel. The inlet of the pump head 23 is connected to the outlet of the pump head 3 via a connection channel 18. A primary-side pressure sensor 20 for detecting a pressure (P1) in the pump chamber 4 is provided on the connection channel 18. The primary-side pressure sensor 20 is for detecting a pressure in the pump chamber 4 of the primary-side pump 2 during non-discharge time when the primary-side pump 2 is not in the discharge process as a non-discharge time pressure.

The discharge channel 38 is connected to the outlet of the pump head 23. The discharge channel 38 communicates with, for example, an analysis channel of a liquid chromatograph. A secondary-side pressure sensor 40 that detects a pressure (P2) in the pump chamber 24 as a feeding pressure is provided on the discharge channel 38.

The operations of the primary-side pump drive motor 12 and the secondary-side pump drive motor 34 are controlled by a controller 42. The controller 42 is configured to operate the primary-side pump 2 and the secondary-side pump 22 in a complementary manner so that the flow rate of the liquid fed through the discharge channel 38 becomes a preset target flow rate.

The complementary operation of the primary-side pump 2 and the secondary-side pump 22 will be described. While the primary-side pump 2 executes a discharge process for discharging a liquid, the secondary-side pump 22 executes a suction process for sucking a liquid, and a part of the liquid discharged from the primary-side pump 2 is sucked into the pump chamber 24 of the secondary-side pump 22. When the suction process of the secondary-side pump 22 is completed, the secondary-side pump 2 shifts to the discharge process. At this time, the primary-side pump 2 shifts to the suction process, and after the suction process is completed, a precompression process is executed.

During the discharge process of the secondary-side pump 22, that is, during the non-discharge time when the primary-side pump 2 is not in the discharge process, the check valve 26 is closed. Thereby, the communication between the pump chamber 4 of the primary-side pump 2 and the discharge channel 38 is shut off. Thus, the pump in which communication with the discharge channel 38 is shut off during the non-discharge time is referred to as a closing pump in the present application. Since the liquid feeding device of this embodiment is a series-type double plunger system, only the primary-side pump 2 corresponds to the closing pump, but in the case of a parallel-type double plunger system, both plunger pumps correspond to the closing pump.

Further, the non-discharge time pressure P1 detected by the primary-side pressure sensor 20 and the feeding pressure P2 detected by the secondary-side pressure sensor 40 are taken into the controller 42. The controller 42 is configured to control the operation of the primary-side pump drive motor 12 based on the non-discharge time pressure P1 and the feeding pressure P2 during a precompression process described later.

The controller 42 includes a precompression process execution part 44, a discharge speed calculation part 46, and a discharge operation controller 48. The controller 42 includes, for example, a computer circuit having an arithmetic element such as a microcomputer and a program executed in the computer circuit, and the precompression process execution part 44, the discharge speed calculation part 46, and the discharge operation controller 48 are functions obtained by the arithmetic element of the controller 42 executing a predetermined program.

The precompression process execution part 44 is configured to cause the primary-side pump 2 to execute the precompression process after the suction process for sucking the liquid into the pump chamber 4 is completed during the non-discharge time when the primary-side pump 2 is not in the discharge process. The precompression process is a process for causing the primary-side pump 2 to perform a discharge operation at a timing before the primary-side pump 2 that has completed the suction process shifts to the discharge process until the non-discharge time pressure P1 becomes substantially the same as the liquid feed pressure P2. The timing at which the primary-side pump 2 starts the precompression process is, for example, immediately after the suction process of the primary-side pump 2 is completed.

In this embodiment, the precompression process is performed using the non-discharge time pressure P1 detected by the primary-side pressure sensor 20, but the present invention is not limited to this and can be applied also to a liquid feeding device that is not provided with the primary-side pressure sensor 20. When the primary-side pressure sensor 20 is not provided, the precompression process execution part 44 first executes a precompression process by causing the primary-side pump 2 to perform a discharge operation by a predetermined amount. In the discharge process of the primary-side pump 2 immediately after that, the operation of the primary-side pump 2 is constant-pressure feedback-controlled so that the feeding pressure P2 detected by the secondary-side pressure sensor 40 is constant. At this time, if the precompression of the primary-side pump 2 immediately before that is insufficient, a negative pulsation occurs in the feeding pressure P2, so that a speed of the discharge operation of the primary-side pump 2 is increased. On the other hand, if the precompression of the primary-side pump 2 immediately before that is excessive, a positive pulsation occurs in the feeding pressure P2, so that the speed of the discharge operation of the primary-side pump 2 is reduced. Then, by storing such a correction pattern of an operating speed of the primary-side pump 2 and reflecting it in the precompression process at the next cycle, it is possible to make the pressure in the pump chamber 4 of the primary-side pump 2 substantially the same as the feeding pressure P2 in the precompression process as the cycle is repeated.

The discharge speed calculation part 46 is configured to calculate an optimum value of a speed v of the discharge operation (discharge speed v) during the discharge process of the primary-side pump 2 and the secondary-side pump 22 using a volume V (internal volume before precompression V) of the mobile phase in the pump chamber 4 immediately before the precompression process of the primary-side pump 2 is started, a volume $\Delta V$ (precompression volume $\Delta V$), reduced due to the precompression process, of the mobile phase in the pump chamber 4, and the feeding pressure P2. The optimum value of the discharge speed v is a discharge speed at which a converted value $L_{ATM}$ under the atmospheric pressure of a flow rate $L_{PRE}$ of the mobile phase discharged through the discharge channel 38 becomes a preset flow rate $L_{SET}$.

Here, the discharge speed calculation operation by the discharge speed calculation part 46 will be described.

In general, when a pressure is applied to a fluid, the volume at a rate equal to the product of the compressibility $\beta$ and the pressure P applied to the fluid decreases, and the volume $V_{PRE}$ of the fluid under the pressure P is expressed by the following equation (1). Note that $V_{ATM}$ is the volume of fluid under the atmospheric pressure.

$$V_{PRE}=(1-\beta \times P) \times V_{ATM} \qquad (1)$$

When the above is applied to a liquid feeding device for HPLC that feeds a fluid at high pressure, the following equation (2) is established. Note that, $L_{PRE}$ is a volume flow rate (also referred to as a discharge flow rate) of the mobile phase discharged from the pump chamber of the plunger pump at a discharge pressure $P_{PUMP}$, and $L_{ATM}$ is a volume flow rate of the mobile phase under the atmospheric pressure.

$$L_{PRE}=(1-\beta \times P_{PUMP}) \times L_{ATM} \qquad (2)$$

Here, the relationship of $L_{PRE}$=Plunger cross-section area× Plunger speed  (3)

holds. The liquid feeding device of HPLC adjusts the discharge flow rate $L_{PRE}$ by controlling the speed of the plunger. When the above equation (2) is modified, the following equation (4) is obtained.

$$L_{ATM}=L_{PRE}/(1-\beta \times P_{PUMP}) \geq L_{PRE} \qquad (4)$$

The above equation (4) shows that the atmospheric pressure flow rate $L_{ATM}$ increases by the amount of decompression and expansion with respect to the discharge flow rate $L_{PRE}$ that can be controlled by the liquid feeding device. The user of HPLC sets a desired flow rate as an analysis condition, but if its value is applied to the discharge flow rate $L_{PRE}$ discharged purely from the liquid feeding device, the atmospheric pressure flow rate $L_{ATM}$ is observed as a value increased from the set flow rate $L_{SET}$. In order to confirm the performance of the liquid feeding device, the vendor or the user may perform a validation for measuring a divergence between the set flow rate $L_{SET}$ and the atmospheric pressure flow rate $L_{ATM}$. However, due to the relationship of the above formula (4), there is a divergence between the two, which is an obstacle to determining the validation result, although it cannot be said that it originates from the malfunction of the liquid feeding device itself.

Therefore, using the fluid compressibility $\beta$, there is also a method of adjusting the discharge flow rate $L_{PRE}$ by using the relational expression of $$L_{PRE}=(1-\beta \times P_{PUMP}) \times L_{SET} \qquad (5)$$

However, such a method requires accurate values of the fluid compressibility $\beta$ and the discharge pressure $P_{PUMP}$. The discharge pressure $P_{PUMP}$ can be easily measured by a pressure sensor. On the other hand, for the compressibility $\beta$, it is required that the user may input the value of the compressibility $\beta$ into the HPLC system, or the HPLC system may apply an appropriate compressibility $\beta$ based on the type of fluid (mobile phase) input by the user. It is cumbersome to ask the user for such information input, and there is a risk of causing an input error. It is also impractical to prepare an accurate value of the compressibility $\beta$ for all types and compositions of mobile phases. Furthermore, when the mobile phase is adiabatically compressed in a short time, the mobile phase expands by heat, and the effective compressibility decreases. This is known as the relationship of adiabatic compressibility<isothermal compressibility  (6).

That is, the compressibility has a dependency on the precompression time, which also becomes an obstacle to preparing an accurate compressibility in advance.

In this embodiment, information on the compressibility of the mobile phase is acquired using the precompression process in the closing pump (primary-side pump 2), and the discharge speeds of the pumps 2 and 22 are determined using the information. The change in the volume of the mobile phase in the precompression process can be expressed by the following equation (7) as in the above equations (1) and (2). Note that, V is a volume of the mobile phase in the pump chamber 4 (internal volume of the pump chamber 4) immediately before the precompression process is started, and $V_{PRE}$ is a volume of the mobile phase in the pump chamber 4 (internal volume of the pump chamber 4) immediately after the precompression process is completed. P1 is a pressure in the pump chamber 4.

$$V_{PRE}=(1-\beta \times P1) \times V \qquad (7)$$

Note that, the internal volume of the pump chamber 4 means, in the case of a series-type double plunger pump as in this embodiment, a volume in a system between a check valve 16 on the inlet side of the primary-side pump 2 and a check valve 20 on the inlet side of the secondary-side pump 22. In the case of a parallel-side double plunger pump, it means a volume in a system between a check valve on the inlet side and a check valve on the outlet side of one pump.

From the above equation (7), the following equation (8) expressing an amount of change $\Delta V$ in the volume of the mobile phase in the pump chamber 4 before and after the precompression process (hereinafter referred to as a precompression volume $\Delta V$) is obtained.

$$\Delta V = V - V_{PRE} \qquad (8)$$
$$= \beta \times P1 \times V$$

In the precompression process, the closing pump 2 is driven in the discharge direction so that the pressure P1 in the pump chamber 4 is substantially the same as the discharge pressure P2 (=$P_{PUMP}$), and thus the above equation (8) becomes $$\Delta V = \beta \times P2 \times V \qquad (9).$$

By modifying this equation (9), the following equation (10) is obtained.

$$\beta \times P2 = \Delta V/V \qquad (10)$$

By substituting the above equation (10) into the equation (5), the following equation (11) is obtained.

$$L_{PRE}=(1-\Delta V/V) \times L_{SET} \qquad (11)$$

By applying the set value of the flow rate to $L_{SET}$ in the above equation (11), the discharge flow rate $L_{PRE}$ is obtained such that the flow rate $L_{ATM}$ of the mobile phase under the atmospheric pressure becomes the set flow rate $L_{SET}$. That is, the converted value $L_{ATM}$ under the atmospheric pressure of the discharge channel $L_{PRE}$ becomes the set flow rate $L_{SET}$.

In this embodiment, the discharge speed calculation part 46 of the controller 42 calculates the discharge flow rate $L_{PRE}$ using the above equation (11), and the drive speed (discharge speed) v of the plungers 10 and 32 of the pumps 2 and 22 is determined such that the flow rate of the mobile phase discharged through the discharge channel 38 becomes the discharge flow rate $L_{PRE}$. The discharge operation controller 48 drives the plungers 10 and 32 at the drive speed v determined by the discharge speed calculation part 46.

Figure 2:
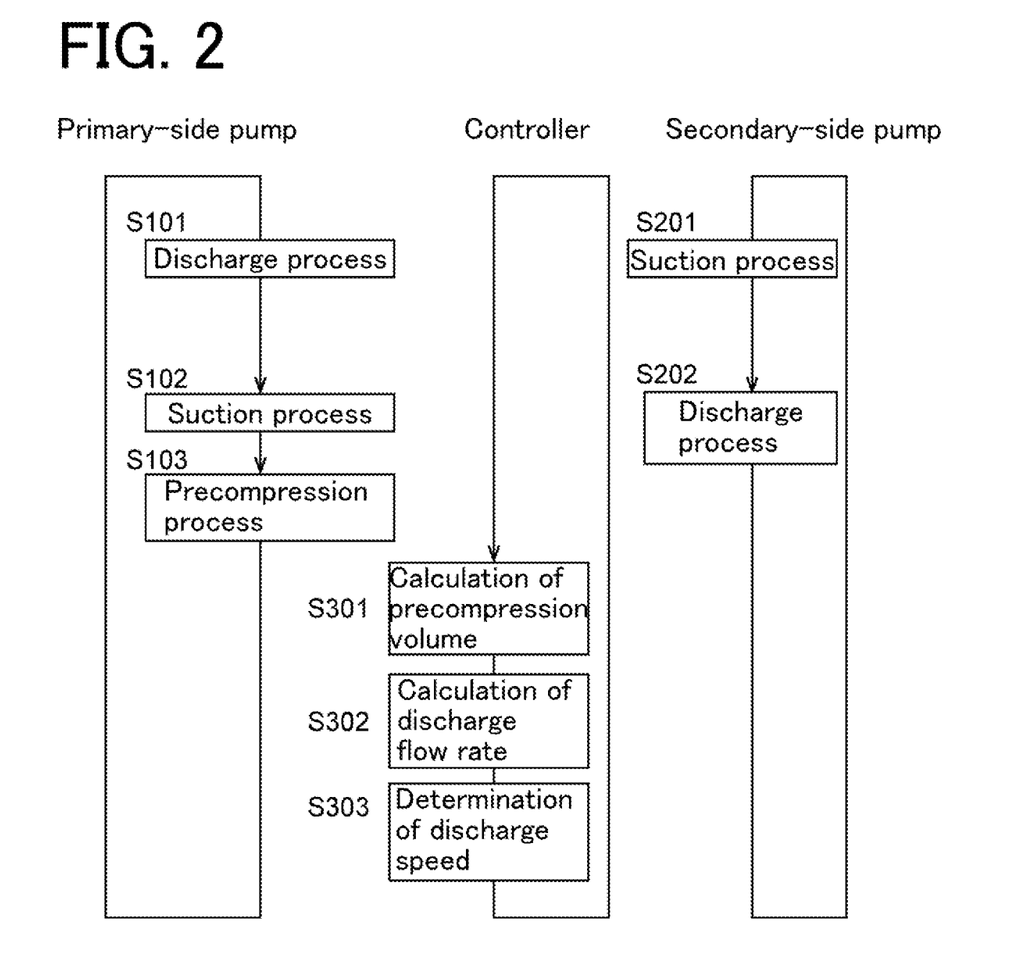
FIG. 2 is a flowchart schematically showing an example of the operation of the embodiment.

FIG. 2 is a flowchart showing an example of the liquid feeding operation of the liquid feeding device 1.

As shown in FIG. 2, the primary-side pump 2 and the secondary-side pump 22 operate in a complementary manner, and the secondary-side pump 22 executes a suction process when the primary-side pump 2 is executing a discharge process (steps S101 and S201), and when the secondary-side pump 22 is executing a discharge process, the primary-side pump 2 executes a suction process and a precompression process (steps S102, S103, and S202).

The discharge speed calculation part 46 of the controller 42 obtains the precompression volume $\Delta V$ based on the driving amount of the plunger 10 during the precompression process after the precompression process of the primary-side pump 2 is completed (step S301), and the precompression volume $\Delta V$ is applied to the above equation (11) to calculate the discharge flow rate $L_{PRE}$ (step 302). Then, the discharge speed calculation part 46 determines the drive speed (discharge speed) v of the plungers 10 and 32 of the pumps 2 and 22 such that the flow rate of the mobile phase discharged through the discharge channel 38 becomes the calculated discharge flow rate $L_{PRE}$.

The discharge operation controller 48 drives discharge of the plungers 10 and 32 of the pumps 2 and 22 at the discharge speed v determined by the discharge speed calculation part 46 in the next discharge process (steps S101 and S202) of the primary-side pump 2 and the secondary-side pump 22.

Incidentally, in the analysis by HPLC or SFC, the feeding pressure P2 may change during the analysis due to a change in the mobile phase composition or the like. The discharge speed v determined by the above operation is fixed without being recalculated until at least the next precompression process (step S103) of the primary-side pump 2 is executed. Therefore, if the feeding pressure P2 fluctuates greatly between the precompression process and the next precompression process, the volume flow rate $L_{ATM}$ under the atmospheric pressure of the mobile phase may deviate from the set flow rate $L_{SET}$. Such a situation is likely to occur due to lengthening of a pump cycle with respect to the analysis time when the flow rate ratio of one of the pumps is small in a high-pressure gradient pump or when the set flow rate is very small as in the so-called micro/nano LC.

Therefore, the discharge speed calculation part 46 may be configured to recalculate the discharge speed v of each pump 2, 22 following the change in the discharge pressure P2. A preferred embodiment of the discharge speed calculation part 46 thus configured will be described with reference to the flowchart of FIG. 3.

Figure 3:
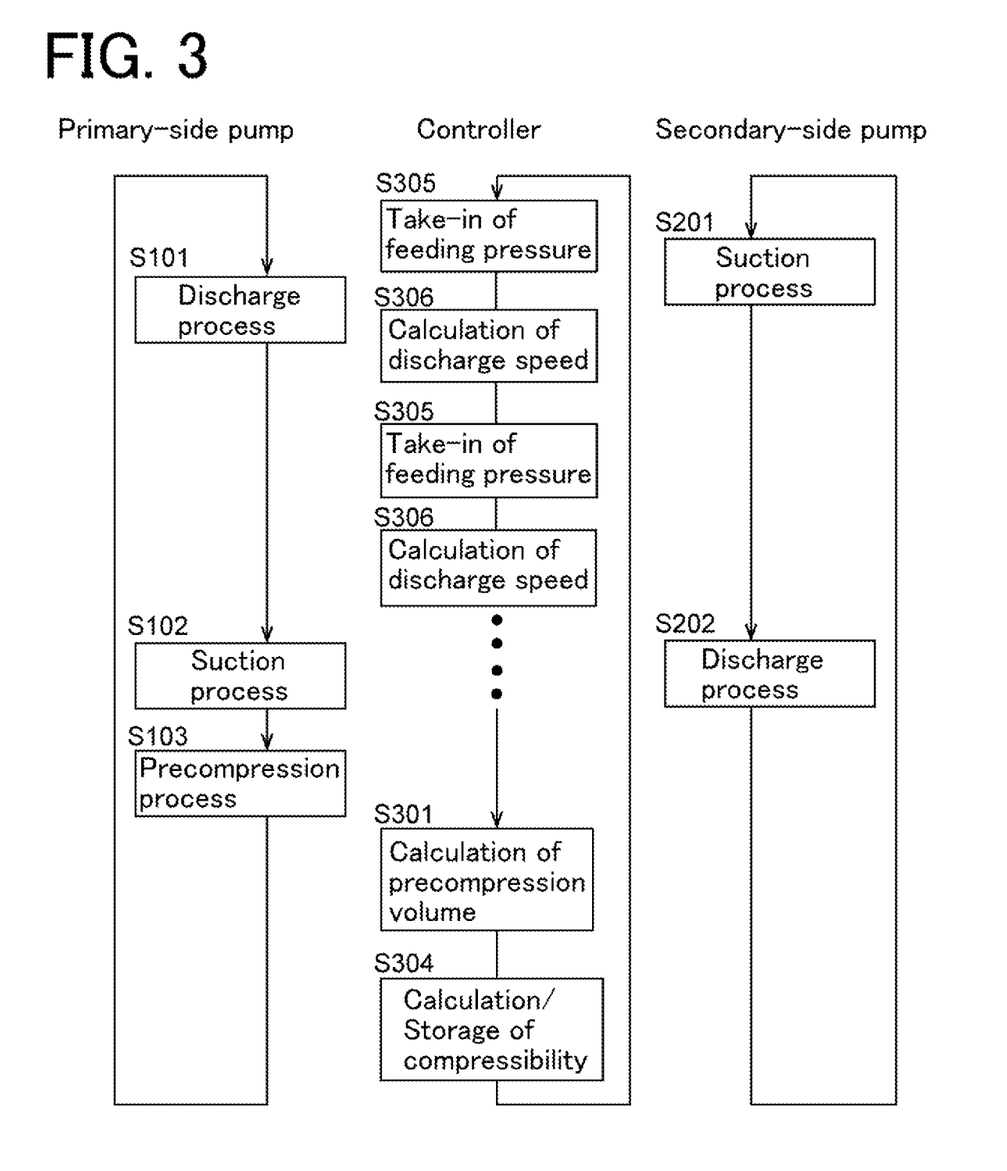
FIG. 3 is a flowchart schematically showing another example of the operation of the embodiment.

The compressibility $\beta$ of the mobile phase can be obtained by the following equation (12) obtained by modifying the above equation (9).

$$\beta = \Delta V / (V \times P2) \tag{12}$$

The discharge speed calculation part 46 calculates the precompression volume $\Delta V$ after the precompression process (S103) of the primary-side pump 2 is completed (step S301), and uses the precompression volume $\Delta V$ and the discharge pressure P2 at the end of the precompression process to obtain the compressibility $\beta$ (step S304). The compressibility $\beta$ obtained here is stored in a storage area provided in the controller 42.

The controller 42 takes in the feeding pressure P2 at regular intervals (step S305). The discharge speed calculation part 46 applies the stored compressibility $\beta$ and the latest feeding pressure P2 to the following equation (13) that is equivalent to the above equation (5) every time the feeding pressure P2 is taken in to obtain the discharge flow rate $L_{PRE}$, and the discharge speed v of each pump 2, 22 is determined based on the discharge flow rate $L_{PRE}$ (step S306).

$$L_{PRE} = (1 - \beta \times P2) \times L_{SET} \tag{13}$$

The discharge operation controller 48 adjusts the discharge speed of the pump 2 or 22 in the discharge process to the recalculated speed v every time the discharge speed calculation part 46 recalculates the discharge speeds of the pumps 2 and 22. Thereby, even when the feeding pressure P2 changes during the liquid feeding, the discharge speeds of the pumps 2 and 22 can be recalculated to optimum values following the change. The compressibility $\beta$ is updated every period of the primary-side pump precompression process (S103).

In the above embodiment, a value based on the mechanical design of the primary-side pump 2 is used as the internal volume V of the pump chamber 4 before the precompression process is started. However, the actual internal volume of the pump chamber 4 may deviate from the design value due to processing errors of each part. Therefore, the function of calculating the actual internal volume V of the pump chamber 4 may be provided to the liquid feeding device 1.

Figure 4:
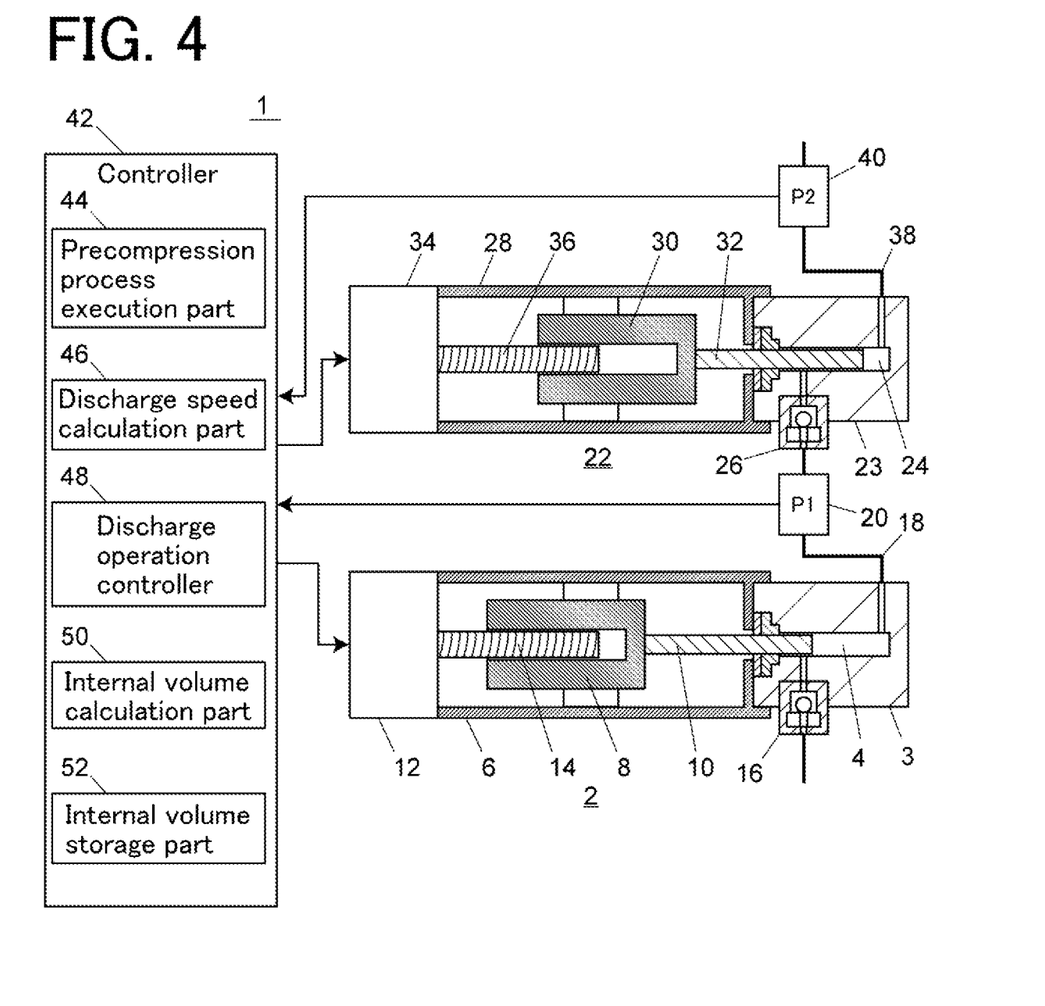
FIG. 4 is a schematic configuration diagram showing another embodiment of the liquid device.

Specifically, as shown in FIG. 4, as the functions of the controller 42, an internal volume calculation part 50 and an internal volume storage part 52 can be provided. The internal volume V before the precompression process is started can be expressed by the following equation (14) obtained by modifying the above equation (9).

$$V = \Delta V / (\beta \times P2) \tag{14}$$

In the above equation (14), the precompression volume $\Delta V$ can be obtained from the driving distance of the plunger 10 during the precompression operation, and the feeding pressure P2 can be read from the pressure sensor 40. Therefore, the internal volume V before the precompression process is started can be obtained by using a mobile phase having a known compressibility $\beta$.

The internal volume calculation part 50 acquires the precompression volume $\Delta V$ and the feeding pressure P2 in the precompression process of the primary-side pump 2 when the mobile phase (for example, water) having a known compressibility $\beta$ is fed, and these are applied to the above equation (14) to give the internal volume V by calculation. The internal volume storage part 52 is a storage area for storing the value of the internal volume V calculated by the internal volume calculation part 50.

The discharge speed calculation part 46 is configured to calculate the discharge speed of each pump 2 using the value of the internal volume V stored in the internal volume storage part 52. Thereby, it is possible to determine the discharge speed of each pump 2 using an accurate value of the internal volume V and to improve the accuracy of the liquid feed flow rate.

In the embodiment described above, every time the precompression process of the primary-side pump 2 is completed, the discharge speed v of each pump 2, 22 is calculated and the compressibility $\beta$ is calculated. As a variation of this, filtering such as a moving average may be applied to the calculation results of several cycles of the pump. Further, when the mobile phase is changed, the calculation of the compressibility $\beta$ and the calculation of the discharge speed v may be executed once, and thereafter, the calculated values may be fixed and applied. These variations can alleviate the concern that calculation errors will cause pump pulsations.

Further, in the above-described embodiment, the embodiment of the present invention has been described based on the state in which the mobile phase is continuously discharged downstream of the liquid feeding device 1. However, the compressibility β may be obtained and stored by feeding the liquid in a state where the discharge channel 38 is sealed using a valve part or the like, and the discharge speed v may be determined using the compressibility β during actual analysis. These variations are also included in the scope of the present invention.

DESCRIPTION OF REFERENCE SIGNS 1, 1a, 1b: Liquid feeding device
2: Primary-side pump (closing pump)
3, 23: Pump head
4, 24: Pump chamber
6, 28: Pump body
8, 30: Crosshead
10, 32: Plunger
12, 34: Motor
14, 36: Feed screw
16, 26: Check valve
20, 40: Pressure sensor
22: Secondary-side pump
42: Controller
44: Precompression process execution part
46: Discharge speed calculation part
48: Discharge operation controller
50: Internal volume calculation part
52: Internal volume holder

The invention claimed is:

1. A liquid feeding device comprising:
a discharge channel;
a pump part having a plurality of plunger pumps connected in series or in parallel to each other and discharging a mobile phase to the discharge channel, wherein at least one of the plurality of plunger pumps is a closing pump in which communication with the discharge channel is shut off during a non-discharge time during which the closing pump is not executing a discharge process for discharging the mobile phase to the discharge channel;
a feeding pressure sensor detecting a feeding pressure which is a pressure in the discharge channel;
a precompression process execution part configured to, based on at least an output of the feeding pressure sensor, execute a precompression process for causing the closing pump during the non-discharge time after completing a suction process for sucking a liquid into a pump chamber of the closing pump to perform a discharge operation so that a pressure in the pump chamber of the closing pump is substantially equal to the feeding pressure;
a discharge speed calculation part configured to calculate a discharge speed v of the plurality of plunger pumps to obtain a flow rate $L_{PRE}$ of the mobile phase discharged to the discharge channel from the pump part such that a converted value of a flow rate $L_{ATM}$ of the mobile phase under an atmospheric pressure becomes a set flow rate $L_{SET}$ based on a volume V of the mobile phase in the pump chamber of the closing pump immediately before the precompression process is started, and a volume ΔV, reduced due to the precompression process, of the mobile phase in the pump chamber of the closing pump; and
a discharge operation controller configured to control a discharge speed of the plurality of plunger pumps during a discharge process to be the discharge speed v obtained by the discharge speed calculation part.

2. The liquid feeding device according to claim 1, further comprising a non-discharge time pressure sensor detecting a non-discharge time pressure which is a pressure in the pump chamber of the closing pump during the non-discharge time, wherein
the precompression process execution part is configured to cause the closing pump to perform a discharge operation so that the non-discharge time pressure is substantially equal to the feeding pressure, based on the output of the feeding pressure sensor and an output of the non-discharge time pressure sensor in the precompression process.

3. The liquid feeding device according to claim 1, wherein the discharge speed calculation part is configured to calculate a compressibility β of the mobile phase using a volume V of the mobile phase in the pump chamber of the closing pump immediately before the precompression process is started, a volume ΔV, reduced due to the precompression process, of the mobile phase in the pump chamber of the closing pump, and the feeding pressure P, and to calculate the discharge speed v of the plunger pump based on the compressibility β and the feeding pressure P.

4. The liquid feeding device according to claim 3, wherein the discharge speed calculation part is configured to read the feeding pressure P and calculate the discharge speed v of the plurality of plunger pumps using the read feeding pressure P and the latest compressibility β of the mobile phase.

5. The liquid feeding device according to claim 1, further comprising:
an internal volume calculation part configured to control the closing pump to suck the mobile phase having a known compressibility into the pump chamber of the closing pump and then execute the precompression process, and to obtain information regarding an internal volume of the pump chamber using a discharge operation amount of the closing pump, the feeding pressure, and the compressibility of the mobile phase, in the precompression process; and
an internal volume storage part storing information regarding the internal volume of the pump chamber obtained by the internal volume calculation part, wherein
the discharge speed calculation part is configured to use the information regarding the internal volume stored in the internal volume storage part as a volume V of the mobile phase in the pump chamber of the closing pump immediately before the precompression process is started.

6. A fluid chromatograph comprising:
an analysis channel;
a liquid feeding device according to claim 1, feeding a mobile phase in the analysis channel;
a sample injection part configured to inject a sample into the analysis channel;
an analytical column provided downstream of the sample injection part on the analysis channel and separating the sample injected by the sample injection part into components; and
a detector provided downstream of the analytical column on the analysis channel and detecting the components separated by the analytical column.

* * * * *